United States Patent Office 3,278,262
Patented Oct. 11, 1966

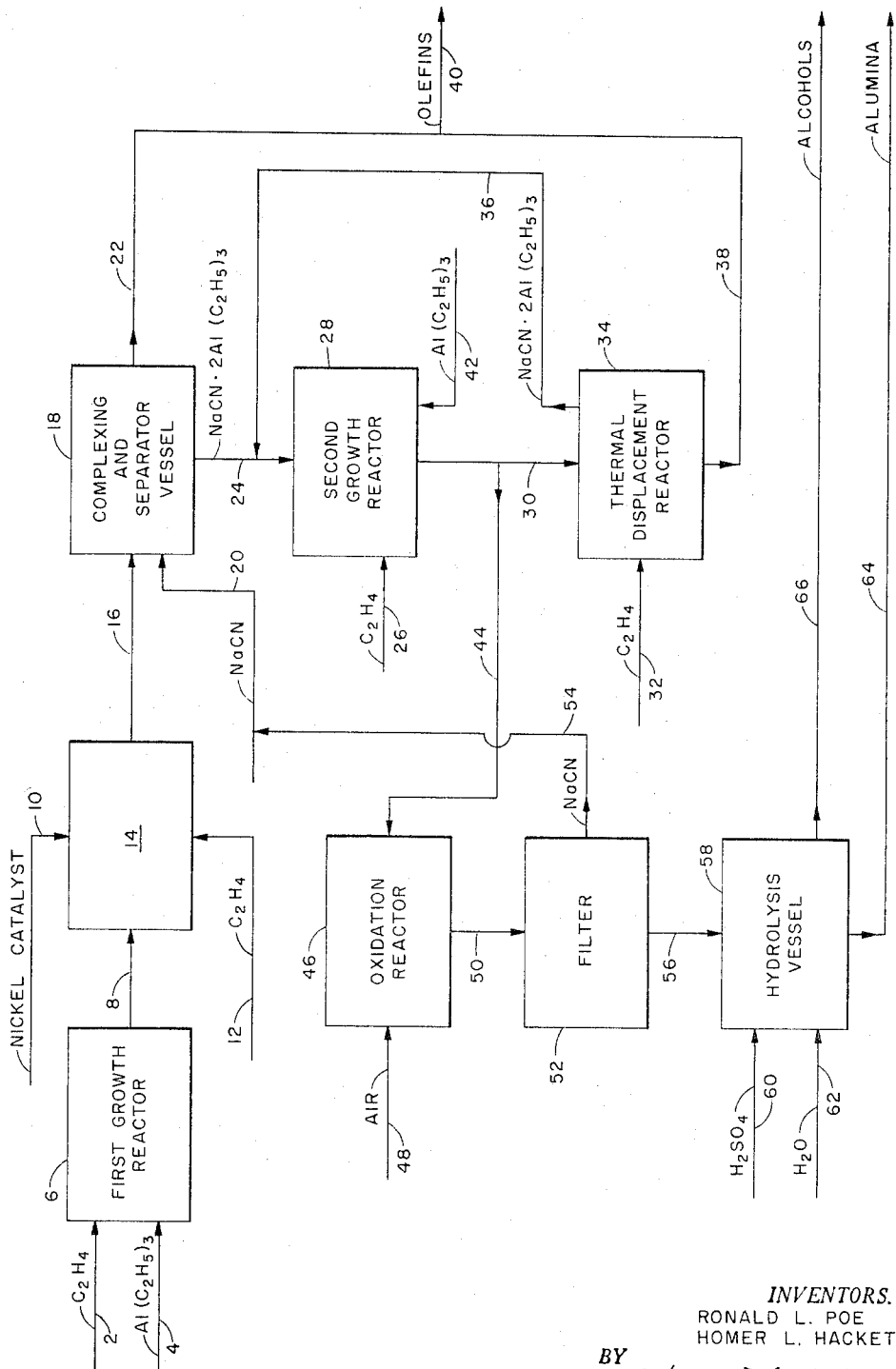

3,278,262
PREPARATION OF ALPHA-OLEFINS, ALKANOLS AND ALUMINA
Ronald L. Poe and Homer L. Hackett, Ponca City, Okla., assignors to Continental Oil Company, Ponca City, Okla., a corporation of Oklahoma
Filed Nov. 25, 1960, Ser. No. 71,612
4 Claims. (Cl. 23—143)

This invention relates to a method for the preparation and recovery of alpha-olefins and alkanols having a carbon content of at least 3 from ethylene. In one aspect, it relates to a process wherein an alkali metal cyanide-aluminum alkyl complex is employed to produce said olefins and alkanols.

Heretofore, several methods have been proposed for the production of higher olefins from lower olefins. In general, these proposed methods have involved the reaction of a trialkyl-aluminum compound with a lower olefin, specifically, ethylene to form the so-called growth product. After forming the growth product, it is heated in the presence of an additional quantity of ethylene and a finely divided metal catalyst, such as finely divided nickel. Finally, the higher olefin is recovered from the reaction mass by distillation. The former reaction may be illustrated equationwise as follows:

(1)
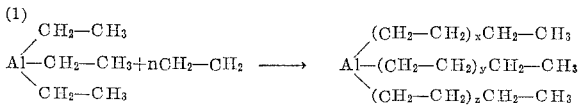

wherein $x$, $y$, and $z$ represent integers ranging from 0–14 (average 3–7) and $x+y+z=n$.

The foregoing reaction may be carried out by passing ethylene through triethylaluminum, preferably in the presence of a diluent under a wide variety of reaction conditions, e.g., 65°–150° C. and 200–5,000 p.s.i.g., preferably 90°–120° C. and 1,000–3,500 p.s.i.g. It is to be understood that, instead of employing triethylaluminum as the starting trialkylaluminum in the above reaction, other low molecular weight alkyl ($C_2$–$C_4$) aluminum compounds such as tripropylaluminum, tributylaluminum, triisobutylaluminum, diethylaluminum hydride, ethylaluminum dihydride, etc., may be employed; and in lieu of ethylene, other low molecular weight aliphatic mono-1-olefins, such as propylene and the like may be substituted. Generally, $C_2$–$C_4$ olefins are preferred as the growth hydrocarbon compound.

The higher olefins are produced by heating growth product, usually at a temperature from about 50 to about 150° C. for 1 to 30 minutes in the presence of an additional quantity of ethylene and a catalyst, which process is known as the displacement reaction. The displacement reactions can be illustrated equationwise as follows:

(2) $Al(CH_2—CH_2—R)_3 + 3C_2H_4 \rightleftarrows$
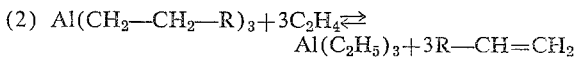
$Al(C_2H_5)_3 + 3R—CH=CH_2$ where $R=H$, $C_2H_5$, $C_4H_9$, $C_6H_{13}$, etc.

Ordinarily, the alpha-olefins and triethylaluminum produced in the displacement reaction would be recovered by fractional distillation; however, under the distillation conditions, the triethylaluminum and alpha-olefins tend to undergo a reverse displacement reaction. Furthermore, there is a tendency for the alpha-olefins to isomerize under these conditions. Both the reverse displacement reaction and the tendency of the alpha-olefins to isomerize are accelerated by the catalyst employed in the displacement reaction.

In addition, separation of the alpha-olefins from the triethylaluminum is made difficult by the fact that certain of the olefins have boiling temperatures very close to triethylaluminum and are very difficult to separate.

In one method, recovery of the alpha-olefins and triethylaluminum has been simplified by complexing the triethylaluminum present in the displacement product with an alkali metal cyanide. This complex forms a separate phase which is readily separable from the alpha-olefins. In addition, the alkali metal cyanide acts to inhibit the reverse displacement and isomerization reactions. The alkali metal cyanide complexes, their preparation and use in the above separation are described in detail in copending application Serial No. 37,821, filed July 6, 1960, issued as U.S. Patent No. 3,206,522 on September 14, 1965.

After separation of the complex, this material can be partially decomposed by heating to provide an intermediate complex, or the alkali metal cyanide and aluminum triethyl can be regenerated by total decomposition. Unfortunately, decomposition of the complex requires high temperatures and low pressures; and in addition, if an attempt is made to decompose beyond the intermediate complex, that is, to the cyanide and aluminum triethyl, the problem is presented of processing and handling the solid alkali metal cyanide. It would, of course, be advantageous to operate in such a manner that decomposition of the complex would not be necessary or, if necessary, that the disadvantages set forth above could be avoided.

It is, therefore, a principal object of the present invention to provide a process for the production of alpha-olefins and alkanols which obviates the disadvantages of the prior art processes.

It is another object of this invention to provide a process whereby alpha-olefins and alkanols containing at least 3 carbon atoms can be produced from ethylene by a process which is economical and simple to operate.

Still another object of this invention is to provide a process for utilizing alkali metal cyanide-aluminum alkyl complex in the production of alpha-olefins and alkanols.

The foregoing objects are realized broadly by reacting an alkali metal cyanide-aluminum alkyl complex with a low molecular weight olefin to form a "growth" product, that is, complex of alkali metal cyanide and aluminum alkyl, in which the alkyl groups are of increased molecular weight.

In one aspect of the invention, the reaction is carried out in the presence of a catalyzing amount of aluminum triethyl.

In another aspect of the invention, the complex growth product is further reacted with low molecular weight olefin to displace high molecular weight olefins from said growth product, said olefins being recovered as product.

In another aspect of the invention, the alkali metal cyanide-aluminum alkyl growth product is oxidized to form alkoxy growth product. Alkali metal cyanide released in the oxidation is recovered, and thereafter the alkoxy growth product is hydrolyzed to provide alcohols and hydrated alumina, which can be recovered as separate products.

In still another aspect of the invention, recovery of alkali metal cyanide from alkoxy product is effected by heating growth product to coagulate the alkali metal cyanide, which is thereafter recovered by a suitable separation method such as centrifugation, filtration, etc.

In yet another aspect, the invention relates to a two-stage process for the formation of olefins, wherein the first stage comprises reacting aluminum alkyl with low molecular weight olefin to provide growth product, displacing said growth product with additional low molecular weight olefin in the presence of a reducing catalyst, separating displaced olefins from low molecular weight aluminum alkyl by complexing said aluminum alkyl with an alkali metal cyanide, said complex forming a separate phase from said olefins, subjecting said complex to a second growth reaction in the presence of low molecular weight olefin, oxidizing said complex-growth product to form alkoxy growth product whereby alkali metal cyanide is released, recycling alkali metal cyanide to the complexing reaction in the first stage, thereafter hydrolyzing the alkoxy growth product and recovering alcohols and hydrated alumina from the hydrolysis product.

The foregoing two-stage process can also include a process wherein complex-growth product is utilized for the further production of olefins. In this aspect of the invention, complex-growth product is subjected to a thermal displacement in the presence of a low molecular weight olefin followed by recovery of the displaced olefins and recycle of the sodium cyanide-triethyl complex to the second growth reactor.

The invention is best described by reference to the accompanying drawing, which is a diagrammatic illustration of a process system comprising a first growth reactor, a catalytic displacement reactor, complexing and separator vessel, a second growth reactor, a thermal displacement reactor, an oxidation reactor, an alkali metal cyanide filter, and a hydrolysis vessel.

Referring to the drawing, a growth reaction is carried out in a first growth reactor 6 between ethylene and aluminum triethyl, introduced to the reactor through conduits 2 and 4, respectively. In this reaction, which is carried out at elevated temperature and pressure, ethylene molecules are added to the ethyl groups to provide high molecular weight aluminum alkyls in which the alkyl groups can vary up to 30 or more carbon atoms. Growth product is withdrawn from reactor 6 and passed through conduit 8 into a catalytic displacement reactor 14. A nickel catalyst is also introduced to the latter reactor through conduit 10 and ethylene through conduit 12. In reactor 14, ethylene reacts with the growth product under the influence of the nickel catalyst to displace high molecular weight olefins. This reaction is ordinarily carried out at elevated temperatures. The reaction product which comprises a mixture of catalyst, aluminum triethyl and olefins containing from 2 to as high as 30 carbon atoms or higher passes from the reactor through conduit 16 to a complexing and separator vessel 18. In this vessel, sodium cyanide, which is introduced through conduit 20, reacts with aluminum triethyl to produce a complex containing one mole of metal cyanide and two moles of aluminum triethyl. Conditions are maintained in vessel 18 such that the complex is in the liquid state, whereby the complex and olefins form separate phases. The olefins are separated, e.g., by decantation and are removed from vessel 18 through conduit 22 and subsequently conduit 40.

The sodium cyanide-aluminum triethyl complex, which is withdrawn from vessel 18 through conduit 24, is subjected to a second growth reaction. This is effected by introducing the complex to a second growth reactor 28, along with ethylene introduced through conduit 26. In reactor 28, the complex is grown at elevated temperature and pressure to provide a product containing one mole of sodium cyanide for each two moles of aluminum alkyl growth product. Preferably, this reaction is carried out in the presence of a catalyzing amount of aluminum triethyl introduced to the reactor through conduit 42. The growth product is passed from the second growth reactor through conduit 44 and introduced to oxidation reactor 46. In the latter reactor, oxidation of the alkyl groups contained in the growth product is effected by contacting the growth product with air or other oxygen-containing gas introduced into the reactor through conduit 48. In the formation of the alkoxides, the complex is destroyed with the release of sodium cyanide. In order to effect removal of the sodium cyanide, which is soluble in the alkoxides at ambient temperature, the oxidation reaction product is heated whereby the sodium cyanide coagulates, the heated mixture being removed from the oxidation reactor through conduit 50 and introduced to filter 52. The sodium cyanide, which is separated by filtration, is removed from filter 52 and recycled to the complexing and separator vessel 18 through conduit 54. The alkoxides which remain after filtration are introduced through conduit 56 to hydrolysis vessel 58 wherein they are contacted with sulfuric acid introduced through conduit 60. The hydrolysis reaction which follows provides hydrated alumina which is withdrawn from vessel 58 through conduit vessel 64 and an admixture of alcohols which are withdrawn through conduit 66. If desired, the products can be neutralized and washed with water introduced through conduit 62.

The preceding discussion illustrates a preferred embodiment of the invention wherein olefins and alcohols are produced in a two-stage process utilizing in the second stage sodium cyanide-aluminum triethyl complex which is formed in the first stage. This embodiment also illustrates the formation of growth product from alkali metal cyanide-aluminum alkyl complex of the catalysis of this growth reaction through the use of aluminum triethyl.

The invention can also be applied in a process in which olefins are produced, both in the first and second stage, with the formation of alkali metal cyanide-aluminum alkyl complex growth product in the second stage.

Referring again to the drawing, a portion of the effluent growth complex from reactor 28 is introduced through conduit 30 to thermal displacement reactor 34. Ethylene is also introduced to the latter reactor through conduit 32. Thermal displacement is utilized in this stage of the process, since the displacing power of the nickel catalyst would be neutralized by the sodium cyanide present in the growth product. Through the effect of increased temperature, high molecular weight olefins are displaced from the growth product whereby sodium cyanide-aluminum triethyl complex is again obtained. The olefins obtained in this reaction are again separated from the complex by decantation and are yielded from the displacement reactor through conduits 38 and 40. The regenerated sodium cyanide-aluminum triethyl complex is recycled through conduit 36 for reuse in the second growth reactor 28.

It is apparent from the foregoing that the process of this invention provides for effective use of sodium cyanide trialkylaluminum complex, both in the production of olefins and in the production of alcohols, and further obviates certain disadvantages which are ordinarily present in the regeneration of these complexes.

While the process has been described as employing specific reactants, it is within the scope of the invention to employ other reactants as previously set forth.

The catalysts which are used in the catalytic displacement reaction include not only nickel but also other reduction catalysts, such as cobalt, palladium, and certain iron compounds. The preferred catalysts is nickel or a nickel compound, which will react with the trialkylaluminum. Specific nickel catalysts include finely divided metallic nickel, Raney nickel, nickel acetylacetonate, nickel naphthanate, etc. The amount of catalyst employed can vary widely; however usually it is used in amounts from about 0.001 to 0.1 percent based on the weight of growth product.

Any of the alkali metal cyanides can be used in the complexing of aluminum trialkyl. Particularly preferred are sodium and potassium cyanides and more preferably sodium cyanide. The cyanide complexes with aluminum trialkyl to provide a product containing one mole of cyanide for each two moles of aluminum trialkyl. The complexes are formed at temperatures ranging from room temperature to about 250° C. By appropriate control of the temperature, the complex can be maintained in the liquid state whereby it is readily separable from olefins by phase separation. The complexes are decomposed by heating into the alkali metal cyanide and aluminum trialkyl. This decomposition can be effected under pressures from about 1 to 500 mm. of mercury at temperatures from about 100 to 200° C.

The conditions employed in the growth of the alkali metal cyanide-trialkylaluminum complex are similar to those which are used for growing the aluminum trialkyl alone. The preferred conditions for this growth reaction are temperature from about 130 to about 140° C. at a pressure between about 2,000 and about 3,000 p.s.i.g.

Thermal displacement of olefins from the alkali metal cyanide-trialkylaluminum growth product can be carried out at elevated temperatures, for example, between about 100 and about 700° F. and between about 1 and 200 p.s.i.a. for between about 30 seconds and about 15 minutes. In one method which is set forth in more detail in copending application of Eugene F. Kennedy, Jerry A. Acciarri, and Jimmie R. Bowden, Serial No. 70,771, filed November 21, 1960, now Patent No. 3,210,435, thermal displacement is carried out under the foregoing conditions, with the growth product being displaced while in an atomized state.

As pointed out previously in the discussion of the drawing, aluminum triethyl is recycled to the second growth reaction for use therein as a catalyst. It has been found that this material has a substantial effect on the rate of growth of the alkali metal cyanide-aluminum trialkyl complex. The catalytic amount of aluminum triethyl is the amount present in the growth reaction in excess of that required to form the aluminum triethylalkali metal cyanide complex. This excess aluminum triethyl can range from as low as 1 to as high as 100 percent or higher of the amount of aluminum triethyl in the complex.

The oxidation reaction in which the complex growth product is converted to alkoxides and decomposed is carried out over a relatively wide range of temperatures, usually between about 0 and 100° C. and preferably between about 30 and 60° C. As pointed out in the discussion, the alkali metal cyanide is soluble in the alkoxides which are formed at the preferred oxidation temperatures. It has been found, however, that if the mixture is heated to about 120° C., the cyanide coagulates and can be separated from the alkoxides by a suitable method, such as filtering, centrifugation, etc.

The hydrolysis of the alkoxides is carried out in a conventional manner with the use of any of the ordinary hydrolyzing agents such as acids, water, bases, etc.

The following examples are presented in illustration of the invention:

EXAMPLE 1

*Run No. 1.*—The aluminum triethyl-sodium cyanide complex used in this run was obtained from the complex layer formed during the separation of aluminum triethyl from alpha-olefins displaced from aluminum alkyl growth product. The aluminum triethyl-sodium cyanide complex (75 ml.) and dry iso-octane (225 ml.) were charged to a 1-liter stirred autoclave. The autoclave was assembled and placed in its holder. The temperature of the complex and solvent was raised to 125° C. While at 125° C., the autoclave was charged to 2,500 p.s.i.g. of ethylene for 5 hours. The autoclave was cooled and vented; and the growth complex was siphoned from the autoclave. A small sample of the product was hydrolyzed, and the organic layer from the hydrolysis was run on the gas-liquid phase chromatography.

*Run No. 2.*—The aluminum triethyl-sodium cyanide complex used in this run was a 2.02:1 complex. The aluminum triethyl-sodium cyanide complex (160 ml.) and dry n-nonane (160 ml.) were charged to a 1-liter autoclave. The autoclave was assembled and placed in its holder. The temperature was raised to 140° C., and an ethylene pressure of 3,000 p.s.i.g. was applied for 8 hours. The autoclave was cooled and vented; however, upon dismantling the autoclave, it was noted that the autoclave was liquid full. The product was siphoned from the autoclave, and a sample was hydrolyzed for gas-liquid phase chromatography analysis.

*Run No. 3.*—The 2.02:1 aluminum triethyl-sodium cyanide complex (80 ml.) and dry n-nonane (80 ml.) were charged to the autoclave. Nickel naphthenate was added to the contents of the autoclave to give a nickel concentration of 300 parts per million. The autoclave was assembled and placed in its holder. The temperature was raised to 142° C., and an ethylene pressure of 3,000 p.s.i.g. was applied for 10 hours. The autoclave was cooled, vented, and dismantled. The product was siphoned from the autoclave, and a sample was hydrolyzed for gas-liquid phase chromatography analysis.

*Run Nos. 4 and 5.*—Dry n-nonane (80 ml.) and aluminum triethyl (10 ml.) were charged to the autoclave. Enough nickel naphthenate was charged to make a final concentration of 300 parts per million of nickel. The 2.02:1 aluminum triethyl-sodium cyanide complex (80 ml.) was charged and the autoclave assembled and placed in its holder. The autoclave was heated to the desired temperature and charged with 3,000 p.s.i.g. of ethylene for the desired length of time. The autoclave was cooled and vented, and the product was siphoned into a glass container. Samples were hydrolyzed for gas-liquid phase chromatography analysis.

*Run No. 6.*—A sample of 2:1 aluminum triethyl-sodium cyanide complex (100 ml.) and dry n-nonane (100 ml.) were charged to the autoclave. The autoclave was heated to 120° C., and 1,600 p.s.i.g. of ethylene pressure was placed on the system. There was very little pressure drop within the first two hours; therefore the temperature was raised to 140° C. and the reaction allowed to continue for 8 hours. The autoclave was cooled and vented. The autoclave was disassembled, and the product was siphoned into glassware. A sample was hydrolyzed for gas-liquid phase chromatography analysis.

The results obtained in Runs 1 to 6 are presented in Table I.

*Table I*

| Run | No. 1 | No. 2 | No. 3 | No. 4 | No. 5 | No. 6 |
| --- | --- | --- | --- | --- | --- | --- |
| Ml. Complex | 75 | 160 | 80 | 80 | 80 | 100 |
| Solvent | iC$_9$H | nC$_9$H | nC$_9$H | nC$_9$H | nC$_9$H | nC$_9$H |
| Ml. Solvent | 225 | 160 | 80 | 80 | 80 | 100 |
| Ni, p.p.m. | | | 300 | 300 | 300 | |
| Percent Excess Aluminum Triethyl | | | | 15 | 15 | |
| Temperature | 125 | 140 | 142+ | 136 | 124 | 120 / 140 |
| Pressure | 2,500 | 3,000 | 3,000 | 3,000 | 3,000 | 1,600 / 1,600 |
| Time, hr | 5 | 8 | 10 | 5 | 7 | 2 / 8 |
| "m" Value* | ~1 | 4.5 | 6.1 | 4.6 | 4.5 | 2.9 |
| Weight Percent Olefins | | 12 | 16 | 10 | 6 | <5 |

*The product of the growth reaction follows a statistical distribution known as the Poisson Distribution. Mathematically, this may be expressed as follows:

$$(\text{moles})_n \alpha f(n) = \frac{e^{-m} m^n}{n!}$$

where:

(moles)$_n$ = number of moles having $n$ additions of ethylene
$n$ = number of additions of ethylene to an Al—S—C group
$m$ = mean number of additions of ethylene It is noted from the data in Table I that a catalytic effect is provided by having an excess of aluminum triethyl present during the growth reaction. Thus comparing Runs 2 and 4, it is noted that excess aluminum triethyl provides a growth product having an "m" value of 4.6 in 5 hours as compared to an "m" value of 4.5 in 8 hours in the absence of excess aluminum triethyl.

EXAMPLE 2

*Run No. 1.*—The growth products (644 gm.) from Runs Nos. 4 and 5 were combined and charged to a two-liter round bottom flask. The flask was equipped with a thermometer, stirrer, and a reflux condenser. Dry air was passed through the complex at 35° C. for 24 hours. The NaCN did not separate from the alkoxide. The total product was hydrolyzed by adding the product slowly to 25 percent $H_2SO_4$ at 70° C. The HCN liberated was allowed to be swept out the hood. A 20 percent NaOH solution was added to the organic layer to neutralize the acid and wash out the cyanide. An emulsion formed and was broken by the addition of a small amount of acetone. An analysis of the product was made using the programed temperature gas-liquid phase chromatography unit. The column was a three-foot silicone gum rubber on celite, and the temperature programing rate was 4.6° C. per minute.

*Run No. 2.*—Growth product (100 ml.) obtained from Run No. 6 of Example 1 was charged to a 200 ml. oxidizing flask and was oxidized at 45° C. for 15 minutes with dry air. The total sample was filtered as described in Example 3 following at 120° C. The filtrate was recharged to the oxidizing flask and further oxidized. A sample of the alkoxides was analyzed by infrared and by the analytical section for $CN^-$. The oxidation was not carried to completion, because some of the infrared data was misinterpreted as showing that oxidation was complete. The oxidized product was hydrolyzed with a 15 percent sodium hydroxide solution. The alcohols were analyzed by the programed temperature gas-liquid phase chromatography.

*Run No. 3.*—An aluminum trihexyl-sodium cyanide complex was prepared in a three-necked one-liter round bottom flask. Aluminum trihexyl (49.6 grams) was added to dried sodium cyanide (4.31 grams). This mixture was heated to 120° C. for 1½ hours while stirring vigorously. The complex (40 ml.) was charged to a 200 ml. oxidation flask and oxidized with dry air. Samples were withdrawn after 0, ¼, ½, 1, 2, 6, and 10 hours' oxidation time, and analysis was made on each sample by infrared. The 6-hour sample was hydrolyzed with 20 percent sodium hydroxide, and the organic layer was analyzed by the programed temperature gas-liquid phase chromatography. Sample 10 is filtered through a column containing filter-aid at 120° C. to remove coagulated sodium cyanide.

The results of the analyses of the products obtained in Runs 1, 2, and 3 are presented in Table II.

*Table II*

| Alcohol | $AlR_3$:NaCN Run No. 1 | $AlR_3$:NaCN Run No. 2 | $Al(C_6H_{13})_3$:NaCN Run No. 3 |
| --- | --- | --- | --- |
| $C_6OH$ | 94.0% | 90.5% | 84.0% |
| $C_8OH$ | 94.4 | 82.7 | |
| $C_{10}OH$ | 89.3 | 74.4 | |
| $C_{12}OH$ | 80.7 | 70.5 | |
| $C_{14}OH$ | 78.3 | 63.5 | |
| $C_{16}OH$ | 76.2 | 51.0 | |
| $C_{18}OH$ | 71.3 | 27.0 | |
| $C_{20}OH$ | 59.8 | | |

The percentages in each of the columns define the proportion of alcohol present for each fraction. For example, in Run No. 1, 94 percent of the first fraction is n-hexanol, the remainder being a mixture of saturated hydrocarbon, aldehyde, etc.

EXAMPLE 3

Aluminum trihexyl (0.111 mole) and n-hexyl alcohol (0.166 mole) were reacted to give the compound $Al(C_6H_{13})_{1.5}(OC_6H_{13})_{1.5}$. This alkoxide was added to 0.055 mole of NaCN and heated to 120° C. for about one hour. An alpha-olefin was added to this solution to determine its effect on the solubility of the NaCN in the alkoxide. It was found that the sodium cyanide remained as free sodium cyanide and did not complex with the aluminum alkoxide.

The following examples are presented in illustration of applications of the invention on a commercial scale:

EXAMPLE 4

Flows: Lb./batch
To First Growth Reactor
  $C_2H_4$ (2) _____ 33,400
  $Al(C_2H_5)_3$ (4) _____ 11,400
To Catalytic Displacement Reactor
  Nickel Catalyst (10) _____ 0.9
  $C_2H_4$ (12) _____ 8,400
To Complexing and Separator Vessel _____
  NaCN (20) _____ 2,450
To Second Growth Reactor
  $NaCN \cdot 2Al(C_2H_5)_3$ (24) _____ 10,850
  $C_2H_4$ (26) _____ 33,400
  $Al(C_2H_5)_3$ (42) _____ 1,000
Ethylene to Thermal Displacement Reactor 8,400
Olefin Yield
  From Complexing and Separator
    Vessel (18) _____ 41,800
  From Thermal Displacement
    Reactor (34) _____ 41,800

Temperatures: ° F.
  First Growth Reactor (6) _____ 248
  Catalytic Displacement Reactor (14) ____ 220
  Complexing and Separator Vessel (18) ___ 176
  Second Growth Reactor (28) _____ 270
  Thermal Displacement Reactor (34) _____ 500

Pressures: P.s.i.g.
  First Growth Reactor (6) _____ 1,500
  Catalytic Displacement Reactor (14) ____ 500
  Complexing and Separator Vessel (18) ___ Atm.
  Second Growth Feactor (28) _____ 2,500
  Thermal Displacement Reactor (34) _____ 70

EXAMPLE 5

Flows: Lb./batch
Air to Oxidation Reactor (48) _____ 4,800
NaCN from Filter (54) _____ 2,450
To Hydrolysis Vessel
  $H_2SO_4$ (60) _____ 40,000
  $H_2O$ (62) _____ 120,000
From Hydrolysis Vessel
  Alumina (64) _____ 5,100
  Alcohols (66) _____ 47,200

Temperatures: ° F.
  Oxidation Reactor (46) _____ 90
  Filter (52) _____ 230
  Hydrolysis Vessel (58) _____ 170

Pressures: P.s.i.g.
  Oxidation Reactor (46) _____ 0
  Filter (52) _____ Diff. 1 atm.
  Hydrolysis Vessel (58) _____ 0

Having thus described the invention by providing specific examples thereof, it is to be understood that no undue limitations or restrictions are to be drawn by reason thereof and that many variations and modifications are within the scope of the invention.

We claim:

1. In a process in which a low molecular weight aluminum alkyl is reacted with a low molecular weight olefin to provide a growth product, in which said growth product is reacted with additional low molecular weight olefin in the presence of a reducing catalyst whereby olefins are displaced from the growth product and in which said displaced olefins are separated from low molecular weight aluminum alkyl by forming a complex of said aluminum alkyl with an alkali metal cyanide, said complex forming a separate phase from said olefins, the improvement which comprises subjecting said complex to a second growth reaction in the presence of low molecular weight olefin, oxidizing said growth product to form alkoxy growth product, recovering alkali metal cyanide released in the oxidation from the alkoxy growth product and recycling said alkali metal cyanide to the complexing reaction hereinbefore described, thereafter hydrolyzing said growth product and recovering alcohols and alumina from the hydrolysis product.

2. The process of claim 1 in which the alkali metal cyanide is sodium cyanide, the low molecular weight aluminum alkyl is triethylaluminum, and the low molecular weight olefin is ethylene.

3. The process of claim 1 in which a portion of said second growth product is heated in the presence of additional low molecular weight olefin whereby olefins are displaced from said growth product, recovering olefins from the displacement product and recycling alkali metal cyanide-aluminum alkyl complex from the displacement product to the second growth reaction.

4. The process of claim 3 in which the alkali metal cyanide is sodium cyanide, the low molecular weight aluminum alkyl is triethylaluminum, and the low molecular weight olefin is ethylene.

References Cited by the Examiner

UNITED STATES PATENTS

| | | |
|---|---|---|
| 2,699,457 | 1/1955 | Ziegler. |
| 2,826,598 | 3/1958 | Ziegler. |
| 2,863,896 | 12/1958 | Johnson. |
| 2,873,290 | 2/1959 | Esmay. |
| 2,889,385 | 2/1959 | Caterall. |
| 2,892,858 | 6/1959 | Ziegler. |
| 2,921,949 | 1/1960 | Kirshenbaum. |

OTHER REFERENCES

Liebigs Annalen der Chemie, vol. 629 (Mar. 1960), pgs. 33–49.

TOBIAS E. LEVOW, *Primary Examiner.*